US012274298B2

(12) United States Patent
Korus et al.

(10) Patent No.: US 12,274,298 B2
(45) Date of Patent: Apr. 15, 2025

(54) HEATING ASSEMBLY AND APPARATUS

(71) Applicant: Nicoventures Trading Limited, London (GB)

(72) Inventors: Anton Korus, London (GB); Patrick Moloney, London (GB)

(73) Assignee: NICOVENTURES TRADING LIMITED, London (GB)

(*) Notice: Subject to any disclaimer, the term of this patent is extended or adjusted under 35 U.S.C. 154(b) by 854 days.

(21) Appl. No.: 17/437,885

(22) PCT Filed: Mar. 9, 2020

(86) PCT No.: PCT/EP2020/056176
§ 371 (c)(1),
(2) Date: Sep. 10, 2021

(87) PCT Pub. No.: WO2020/182712
PCT Pub. Date: Sep. 17, 2020

(65) Prior Publication Data

US 2022/0142251 A1 May 12, 2022

(30) Foreign Application Priority Data

Mar. 11, 2019 (GB) ..................................... 1903278

(51) Int. Cl.
*A24F 40/46* (2020.01)
*A24F 40/20* (2020.01)
(Continued)

(52) U.S. Cl.
CPC .............. *A24F 40/46* (2020.01); *A24F 40/20* (2020.01); *A24F 40/465* (2020.01); *A24F 40/53* (2020.01); *A24F 40/57* (2020.01); *H05B 6/105* (2013.01)

(58) Field of Classification Search
CPC .......... A24F 40/20; A24F 40/51; A24F 40/53; A24F 40/50
See application file for complete search history.

(56) References Cited

U.S. PATENT DOCUMENTS 9,883,698 B2 2/2018 Zhu
2014/0261408 A1* 9/2014 DePiano ................ A24F 40/46 128/202.21

(Continued)

FOREIGN PATENT DOCUMENTS

CN 205005912 U 2/2016
CN 104082863 B 4/2017

(Continued)

OTHER PUBLICATIONS

International Search Report and Written Opinion for International Application No. PCT EP 2020/056176, dated May 18, 2021, 14 pages.

(Continued)

*Primary Examiner* — Truc T Nguyen
(74) *Attorney, Agent, or Firm* — Husch Blackwell

(57) ABSTRACT

A heating assembly for use with apparatus for heating aerosolisable material to volatilise at least one component of the aerosolisable material, the heating assembly including a body, a heating element and a coupler, the body including a cavity for storing the aerosolisable material and for insertion into a heating zone of the apparatus, wherein a portion of the body is open or openable for insertion of the aerosolisable material into the cavity, wherein the heating element for use in heating the aerosolisable material when the aerosolisable material is in the cavity, and wherein the coupler is for coupling the heating assembly to a retainer of the apparatus.

19 Claims, 3 Drawing Sheets

(51) Int. Cl.

| | |
|---|---|
| ***A24F 40/465*** | (2020.01) |
| ***A24F 40/53*** | (2020.01) |
| ***A24F 40/57*** | (2020.01) |
| ***H05B 6/10*** | (2006.01) |

(56) References Cited

U.S. PATENT DOCUMENTS

| | | | | |
|---|---|---|---|---|
| 2017/0055583 | A1 | 3/2017 | Blandino | |
| 2017/0360091 | A1* | 12/2017 | Bless | H02K 7/1853 |
| 2018/0000157 | A1 | 1/2018 | Batista et al. | |
| 2018/0029782 | A1* | 2/2018 | Zuber | A24F 40/42 |
| 2018/0263288 | A1 | 9/2018 | Goldstein et al. | |
| 2024/0215644 | A1* | 7/2024 | Park | H05B 6/686 |

FOREIGN PATENT DOCUMENTS

| | | | | |
|---|---|---|---|---|
| CN | 106617324 | A | 5/2017 | |
| CN | 104585885 | B | 6/2017 | |
| CN | 206923675 | U | 1/2018 | |
| CN | 207 220 159 | U | 4/2018 | |
| CN | 109 330 027 | A | 2/2019 | |
| CN | 208 581 844 | U | 3/2019 | |
| JP | 2018529324 | A | 10/2018 | |
| WO | WO 9920939 | * | 4/1999 | A24F 40/46 |
| WO | 2018190589 | A2 | 10/2018 | |
| WO | 2019030000 | A1 | 2/2019 | |
| WO | WO 2019/030167 | | 2/2019 | |

OTHER PUBLICATIONS

"Office Action received for Canadian Patent Application No. 3132779, mailed on Feb. 29, 2024", 8 pages.

International Preliminary Report on Patentability received for PCT Patent Application No. PCT/EP2020/056176, mailed on Sep. 23, 2021, 8 pages.

Notice of Reasons for Rejection received for Japanese Patent Application No. 2021-554603, mailed on Jan. 10, 2023, 11 pages (6 pages of English Translation and 5 pages Original Copy).

Office Action received for Russian Patent Application No. 2021126376, mailed on Jun. 29, 2022, 14 pages (5 pages of English Translation and 9 pages of Official Copy).

* cited by examiner

HEATING ASSEMBLY AND APPARATUS

RELATED APPLICATION INFORMATION

The present application is a National Phase entry of PCT Application No. PCT/EP2020/0562176, filed Mar. 9, 2020, which claims priority from GB Patent Application No. 1903278.8, filed Mar. 11, 2019, each of which is hereby fully incorporated herein by reference.

TECHNICAL FIELD

The present invention relates to heating assemblies for use with apparatus for heating aerosolisable material to volatilise at least one component of the aerosolisable material, apparatuses for heating aerosolisable material to volatilise at least one component of the aerosolisable material, and systems comprising a heating assembly and an apparatus for heating aerosolisable material to volatilise at least one component of the aerosolisable material.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

A first aspect of the present invention provides a heating assembly for use with apparatus for heating aerosolisable material to volatilise at least one component of the aerosolisable material, the heating assembly comprising a body having a cavity for storing the aerosolisable material and for insertion into a heating zone of the apparatus, wherein a portion of the body is open or openable for insertion of the aerosolisable material into the cavity, a heating element for use in heating the aerosolisable material when the aerosolisable material is in the cavity, and a coupler for coupling the heating assembly to a retainer of the apparatus.

The coupler and retainer are configured to cooperate as an engagement mechanism. The coupler and retainer may cooperate to locate the heating element in the apparatus.

In an exemplary embodiment, the heating assembly comprises an open end communicable with the cavity. In an exemplary embodiment, the body comprises an open end communicable with the cavity.

In an exemplary embodiment, the coupler is for coupling to the retainer by an interference fit with the retainer.

In an exemplary embodiment, the coupler comprises a first thread for engagement with a respective second thread of the retainer of the apparatus.

In an exemplary embodiment, the heating element extends into the cavity. In an exemplary embodiment, the heating member extends from a base of the body. In an exemplary embodiment, the heating member comprises a tapered portion for penetration into the aerosolisable material. In an exemplary embodiment, the heating element is elongate. In an exemplary embodiment, the heating element is a blade.

In an exemplary embodiment, the heating element comprises heating material that is heatable by penetration with a varying magnetic field. In an exemplary embodiment, the body comprises a material that is not susceptible to heating by a varying magnetic field. The material may be ceramic or plastic or other non-susceptor material.

In an exemplary embodiment, the heating material comprises one or more materials selected from the group consisting of: an electrically-conductive material, a magnetic material, and a magnetic electrically-conductive material.

In an exemplary embodiment, the heating material comprises a metal or a metal alloy.

In an exemplary embodiment, the heating material comprises one or more materials selected from the group consisting of: aluminium, gold, iron, nickel, cobalt, conductive carbon, graphite, steel, plain-carbon steel, mild steel, stainless steel, ferritic stainless steel, molybdenum, silicon carbide, copper, and bronze.

In an exemplary embodiment, the aerosolisable material comprises tobacco and/or is reconstituted and/or is in the form of a gel and/or comprises an amorphous solid.

In an exemplary embodiment, the heating element is heatable by electrical resistance. In an exemplary embodiment, the heating assembly comprises an electrical contact for contacting a respective electrical contact of the apparatus to activate the heating element.

In an exemplary embodiment, the coupler is for restraining longitudinal movement of the heating assembly relative to the apparatus when the heating assembly is coupled to the retainer.

A second aspect of the present invention provides a heating assembly for use with apparatus for heating aerosolisable material to volatilise at least one component of the aerosolisable material, the heating assembly comprising a body having a cavity for storing the aerosolisable material and for insertion into a heating zone of the apparatus, wherein a portion of the body is open or openable for insertion of the aerosolisable material into the cavity, and a heating element for use in heating the aerosolisable material when the aerosolisable material is in the cavity, wherein the body comprises a first portion with a first width insertable into the heating zone of the apparatus and a second portion with a second width greater than the first width that is non-insertable into the heating zone.

In an exemplary embodiment, a length of the first portion in a longitudinal direction of the heating assembly may be greater than a length of the second portion in the longitudinal direction.

In an exemplary embodiment, the second portion comprises an aperture communicable with the cavity such that aerosolisable material is insertable through the aperture and into the cavity. In an exemplary embodiment, at least the first portion comprises the cavity.

In an exemplary embodiment, the heating element extends into the cavity. In an exemplary embodiment, the heating member extends from a base of the body. In an exemplary embodiment, the heating member extends from a base of the first portion into the cavity and towards the second portion. In an exemplary embodiment, the heating member comprises an axis parallel to a longitudinal axis of the first portion. In an exemplary embodiment, the axis of the heating member is aligned with the longitudinal axis of the first portion. In an exemplary embodiment, the heating member comprises a tapered portion for penetration into aerosolisable material. In an exemplary embodiment, the heating element is elongate. In an exemplary embodiment, the heating element is a blade.

In an exemplary embodiment, the heating element comprises heating material that is heatable by penetration with a varying magnetic field. In an exemplary embodiment, the body comprises a material that is not susceptible to heating by a varying magnetic field. The material may be a ceramic material.

In an exemplary embodiment, the heating material comprises one or more materials selected from the group consisting of: an electrically-conductive material, a magnetic material, and a magnetic electrically-conductive material.

In an exemplary embodiment, the heating material comprises a metal or a metal alloy.

In an exemplary embodiment, the heating material comprises one or more materials selected from the group consisting of: aluminium, gold, iron, nickel, cobalt, conductive carbon, graphite, steel, plain-carbon steel, mild steel, stainless steel, ferritic stainless steel, molybdenum, silicon carbide, copper, and bronze.

In an exemplary embodiment, the aerosolisable material comprises tobacco and/or is reconstituted and/or is in the form of a gel and/or comprises an amorphous solid.

A third aspect of the present invention provides a heating assembly for use with an apparatus for heating aerosolisable material to volatilise at least one component of the aerosolisable material, the heating assembly comprising a body having a cavity for storing the aerosolisable material and for insertion into a heating zone of the apparatus, wherein a portion of the body is open or openable for insertion of the aerosolisable material into the cavity, and a heating element for use in heating the aerosolisable material when the aerosolisable material is in the cavity, wherein the heating element protrudes substantially linearly into the cavity from a wall of the cavity, or is tubular and at least partially defines a wall of the cavity.

In an exemplary embodiment, the heating element comprises heating material that is heatable by penetration with a varying magnetic field. In an exemplary embodiment, the body comprises a material that is not susceptible to heating by a varying magnetic field. The material may be a ceramic material.

In an exemplary embodiment, the heating material comprises one or more materials selected from the group consisting of: an electrically-conductive material, a magnetic material, and a magnetic electrically-conductive material.

In an exemplary embodiment, the heating material comprises a metal or a metal alloy.

In an exemplary embodiment, the heating material comprises one or more materials selected from the group consisting of: aluminium, gold, iron, nickel, cobalt, conductive carbon, graphite, steel, plain-carbon steel, mild steel, stainless steel, ferritic stainless steel, molybdenum, silicon carbide, copper, and bronze.

In an exemplary embodiment, the aerosolisable material comprises tobacco and/or is reconstituted and/or is in the form of a gel and/or comprises an amorphous solid.

A fourth aspect of the present invention provides an apparatus for heating aerosolisable material to volatilise at least one component of the aerosolisable material, the apparatus comprising a heating zone for receiving a body of a heating assembly, a heating device for causing heating of a heating element of the heating assembly when the heating assembly is present in the heating zone, and a sensor to detect information about a use of the apparatus when the heating assembly is present in the heating zone, and to perform an action when the information meets a predetermined criterion.

In an exemplary embodiment, the action is to provide an indication when the information meets a predetermined criterion. In an exemplary embodiment, the indication may be displayed by a visual and/or audible indicator to alert a user.

In an exemplary embodiment, the heating device comprises a magnetic field generator for generating a varying magnetic field that penetrates the heating zone in use.

In an exemplary embodiment, the information comprises information about a number of sessions of use of the apparatus and/or information about a total power on time of the apparatus.

In an exemplary embodiment, the apparatus comprises a memory to store the information.

In an exemplary embodiment, the apparatus comprises a controller to control the heating device on the basis of the information. In an exemplary embodiment, the apparatus comprises an analyser to analyse the information and the controller is to control heating on the basis of the information analysed by the analyser. In an exemplary embodiment, the controller is to alter heating of the heating element when the analyser determines the predetermined criterion is met. In an exemplary embodiment, the controller is to reduce a heating power of the heating element when the analyser determines the predetermined criterion is met. In an exemplary embodiment, the controller is to disable heating of the heating element when the analyser determines the predetermined criterion is met. In an exemplary embodiment, the action performed by the sensor comprises an output to the controller, wherein the controller is to receive the output from the sensor.

In an exemplary embodiment, the apparatus comprises a retainer for retaining the heating assembly in the heating zone. In an exemplary embodiment, the retainer is for retaining the heating assembly by an interference fit between the retainer and a coupler of the heating assembly.

In an exemplary embodiment, the heating element comprises heating material that is heatable by penetration with a varying magnetic field and the heating device comprises a magnetic field generator for generating varying magnetic fields that penetrate respective portions of the heating element. In an exemplary embodiment, the body comprises a material that is not susceptible to heating by a varying magnetic field. The material may be a ceramic material.

In an exemplary embodiment, the heating material comprises one or more materials selected from the group consisting of: an electrically-conductive material, a magnetic material, and a magnetic electrically-conductive material.

In an exemplary embodiment, the heating material comprises a metal or a metal alloy.

In an exemplary embodiment, the heating material comprises one or more materials is selected from the group consisting of: aluminium, gold, iron, nickel, cobalt, conductive carbon, graphite, steel, plain-carbon steel, mild steel, stainless steel, ferritic stainless steel, molybdenum, silicon carbide, copper, and bronze.

In an exemplary embodiment, the aerosolisable material comprises tobacco and/or is reconstituted and/or is in the form of a gel and/or comprises an amorphous solid.

A fifth aspect of the present invention provides the apparatus as previously described, and the heating assembly as previously described, wherein the heating zone of the apparatus is for receiving the body of the heating assembly A sixth aspect of the present invention provides a system for heating aerosolisable material to volatilise at least one component of the aerosolisable material, the system comprising a heating assembly having a cavity for storing the aerosolisable material, and a heating element for use in heating the aerosolisable material when the aerosolisable material is in the cavity, and an apparatus comprising a heating zone for receiving the heating assembly, and comprising a heating device for causing heating of the heating element of the heating assembly when the heating assembly is present in the heating zone, wherein, when the heating assembly is fully inserted in the heating zone of the apparatus, a portion of the heating assembly protrudes from within the heating zone so as to be grippable by a user to withdraw the heating assembly from the heating zone.

In an exemplary embodiment, the heating zone may be complementary in shape to the heating assembly to engage with the heating assembly.

In an exemplary embodiment, the heating zone may frictionally engage with the heating assembly.

In an exemplary embodiment, the apparatus comprises a retainer, and the heating assembly comprises a coupler, wherein the retainer is for retaining the coupler by an interference fit between the coupler and retainer.

In an exemplary embodiment, the system is for heating non-liquid aerosolisable material.

In an exemplary embodiment, the cavity is to receive aerosolisable material in the form of a rod.

In an exemplary embodiment, the heating element comprises heating material that is heatable by penetration with a varying magnetic field and the heating device comprises a magnetic field generator for generating varying magnetic fields that penetrate respective portions of the heating element. In an exemplary embodiment, the body comprises a material that is not susceptible to heating by a varying magnetic field. The material may be a ceramic material.

In an exemplary embodiment, the heating material comprises one or more materials selected from the group consisting of: an electrically-conductive material, a magnetic material, and a magnetic electrically-conductive material.

In an exemplary embodiment, the heating material comprises a metal or a metal alloy.

In an exemplary embodiment, the heating material comprises one or more materials selected from the group consisting of: aluminium, gold, iron, nickel, cobalt, conductive carbon, graphite, steel, plain-carbon steel, mild steel, stainless steel, ferritic stainless steel, molybdenum, silicon carbide, copper, and bronze.

In an exemplary embodiment, the aerosolisable material comprises tobacco and/or is reconstituted and/or is in the form of a gel and/or comprises an amorphous solid.

BRIEF DESCRIPTION OF THE DRAWINGS

Embodiments of the invention will now be described, by way of example only, with reference to the accompanying drawings, in which.

DETAILED DESCRIPTION

Figure 1:
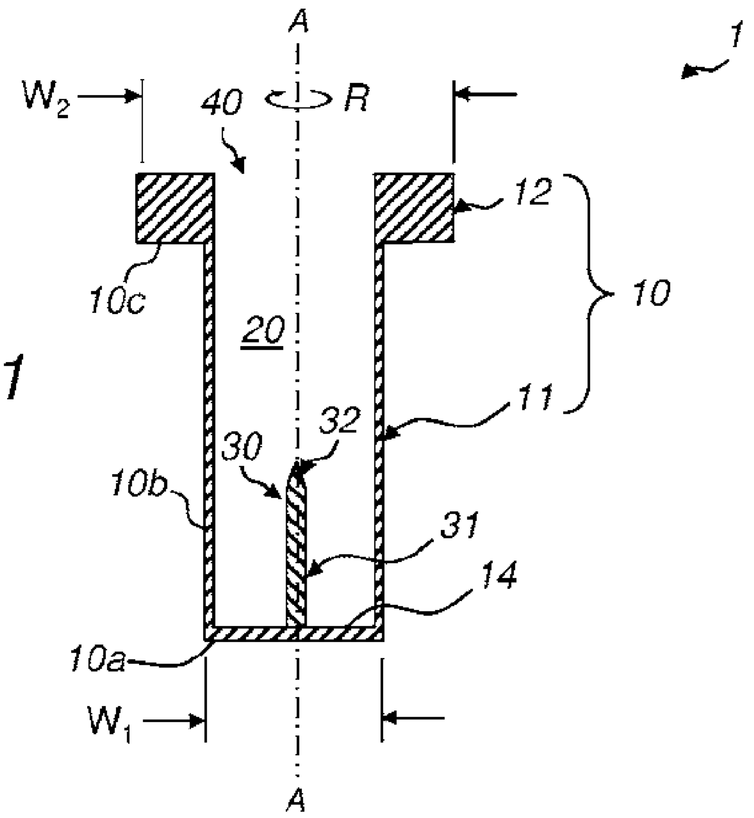
FIG. 1 shows a schematic cross-sectional side view of an example heating assembly for use with apparatus for heating aerosolisable material to volatilise at least one component of the aerosolisable material.

As used herein, the term "aerosolisable material" includes materials that provide volatilised components upon heating, typically in the form of vapour or an aerosol. "Aerosolisable material" may be a non-tobacco-containing material or a tobacco-containing material. "Aerosolisable material" may, for example, include one or more of tobacco per se, tobacco derivatives, expanded tobacco, reconstituted tobacco, tobacco extract, homogenised tobacco or tobacco substitutes. The aerosolisable material can be in the form of ground tobacco, cut rag tobacco, extruded tobacco, reconstituted tobacco, reconstituted aerosolisable material, liquid, gel, amorphous solid, gelled sheet, powder, or agglomerates, or the like. "Aerosolisable material" also may include other, non-tobacco, products, which, depending on the product, may or may not contain nicotine. "Aerosolisable material" may comprise one or more humectants, such as glycerol or propylene glycol.

As noted above, the aerosolisable material may comprise an "amorphous solid", which may alternatively be referred to as a "monolithic solid" (i.e. non-fibrous), or as a "dried gel". The amorphous solid is a solid material that may retain some fluid, such as liquid, within it. In some cases, the aerosolisable material comprises from about 50 wt %, 60 wt % or 70 wt % of amorphous solid, to about 90 wt %, 95 wt % or 100 wt % of amorphous solid. In some cases, the aerosolisable material consists of amorphous solid.

As used herein, the term "sheet" denotes an element having a width and length substantially greater than a thickness thereof. The sheet may be a strip, for example.

As used herein, the term "heating material" or "heater material" refers to material that is heatable by penetration with a varying magnetic field.

Induction heating is a process in which an electrically-conductive object is heated by penetrating the object with a varying magnetic field. The process is described by Faraday's law of induction and Ohm's law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

It has been found that, when the susceptor is in the form of a closed electrical circuit, magnetic coupling between the susceptor and the electromagnet in use is enhanced, which results in greater or improved Joule heating.

Magnetic hysteresis heating is a process in which an object made of a magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule and magnetic hysteresis heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, design freedom and control over the heating profile may be greater, and cost may be lower.

Referring to FIG. 1, there is shown a schematic cross-sectional side view of an example of a heating assembly 1 according to an embodiment of the invention. The heating assembly 1 is is for use with apparatus for heating aerosolisable material to volatilise at least one component of the aerosolisable material, such as the apparatus 200 shown in FIG. 4 and described below. The heating assembly 1 is configured to be removable or detachable, from the apparatus.

The heating assembly 1 comprises a body 10. The body 10 is formed of a first portion 11 and a second portion 12. The first portion 11 is for entry into a heating zone of the apparatus. In this embodiment, the second portion 12 is not insertable in the heating zone of the apparatus. This is because the second portion 12 is positioned at a greater distance along a longitudinal axis A-A from an end of the first portion 11 than a length of the heating zone of the apparatus (wherein said end of the first portion 11 is a point furthest from the second portion 12). Additionally, the second portion 12 has a width that is greater than a width of the heating zone of the apparatus (see FIG. 3). Therefore, the second portion 12 is incapable of being inserted into the heating zone. In other embodiments, the width of the second portion 12 is less than or equal to the width of the heating zone. In such embodiments, the width of the second portion 12 may be less than or equal to a width of the first portion 11. The heating assembly 1 comprises an abutment that limits the entry distance of the heating assembly 1 in the heating zone. In some embodiments, the heating assembly 1 does not comprise such an abutment. In the example shown, the abutment is a surface of the body 10, for example a first surface 10*a*, a second surface 10*b* and/or a third surface 10*c*. Each or all of the first to third surfaces 10*a*-*c* may act as a coupler of the heating assembly for coupling the heating assembly to a respective retainer of the apparatus. A coupler shown in FIG. 1 is for coupling to a respective retainer by an interference fit. An example of a such a retainer is shown in and discussed in relation to FIG. 3. In this embodiment, the first surface 10*a*, second surface 10*b* and third surface 10*c* is flat. In other embodiments, at least one but not all of the first to third surfaces 10*a*-10*c* may be flat. The first surface 10*a* and third surface 10*c* are parallel to each other. The second surface 10*b* is perpendicular to the first surface 10*a* and third surface 10*c*. However, in other embodiments, the respective surfaces may not be parallel and/or perpendicular.

Although the coupler shown in FIG. 1 relies on an interference fit with the retainer of the apparatus, a frictional fit may be sufficient in some embodiments. When an interference fit is used, the width $W_1$ of the first portion 11 may be greater than a corresponding width of the heating zone of the apparatus. Therefore, the second surface 10*b* may be configured to compress inwardly and towards the longitudinal axis A-A as the heating assembly 1 is inserted into the heating zone of the apparatus. However, an interference fit provides greater retention of the heating assembly 1 in the apparatus. In a frictional fit example, the width $W_1$ of the first portion 11 may be less than or equal to the corresponding width of the heating zone of the apparatus such that the second surface 10*b* is configured to engage by friction with a corresponding surface in the heating zone of the apparatus but the width $W_1$ of the first portion 11 does not change.

In some examples, the width $W_1$ of the first portion 10 may vary across the length of the first portion 11 and towards the second portion 12. The first portion 11 may therefore have an external surface which decreases in width from an end of the first portion 11, which may a longitudinal extent of the heating assembly 1. In contrast, a width of an internal surface of the first portion 11 may be constant such that a wall thickness may increase towards the second portion 12. The external surface may taper such that an engagement force increases the more the heating assembly 1 is inserted into the heating zone of the apparatus. The increase of engagement force may be proportional to a distance that the heating assembly 1 is inserted into the heating zone of the apparatus.

In some examples, the coupler may comprise a threaded member to engage with a corresponding threaded member of the retainer. That is, the heating assembly 1 is engageable with the apparatus by relative rotation of the heating assembly 1 and apparatus. This can sometimes be referred to as a screw action. An example axis of a direction of rotation R is shown in FIG. 1. In this instance, the axis of rotation is the longitudinal axis A-A. When the heating assembly 1 is engageable with the apparatus by a screw action, a first surface 10*a* or a second surface 10*c* may act as an abutment member to limit a degree of entry of the heating assembly 1 into the heating zone of the apparatus. Alternatively, the threaded members themselves may be limited to control the extent of entry of the heating assembly 1 into the heating zone. Other mechanical fasteners or connectors may be used as a coupler and respective retainer as long as the heating assembly 1 can be coupled to the apparatus. The second portion 12 of the body 10 may comprise a threaded portion to act as the coupler. Additionally, or alternatively, the first portion 10*a* and/or third surface 10*c* of the second portion 12 may comprise a non-threaded portion and act as the coupler.

In this embodiment, the body 10 of the heating assembly 1 is unitary such that the first and second portions 11, 12 are integral with one another. Therefore, the first and second portions 11, 12 are fixed in position relative to each another. In this embodiment, the body 10 is is generally T-shaped such that the second portion 12 has a width W2 greater than a width $W_1$ of the first portion 11. That is, an exterior width or diameter of the first portion 11 is smaller than an exterior width or diameter of the second portion 12. An internal surface of the first portion 11 may be parallel to an internal surface of the second portion 12. The internal surfaces of the first and second portions 11, 12 may be aligned with each other.

Figure 2:
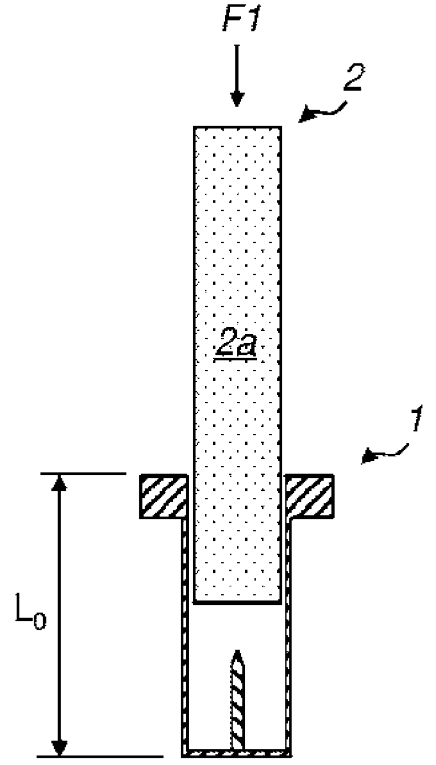
FIG. 2 shows the example heating assembly of FIG. 1 and an example of an article comprising aerosolisable material insertable into the heating assembly.

The body 10 comprises a cavity 20 for receiving and storing aerosolisable material which may be in the form of a rod, as shown in FIG. 2. The cavity 20 is delimited in length by a base 14 of the heating assembly 1 which defines an internal end surface of first portion 11. A shape of the cavity 20 may be complementary to a shape of an article comprising aerosolisable material. In this embodiment, the cavity 20 is circular in cross-section and cylindrical in overall shape. In other embodiments, the cavity may be non-circular in cross-section, for example the cavity may be triangular, square, rectangular, pentagonal or hexagonal. In this embodiment, the walls of the cavity 20 are closed such that aerosolisable material in the cavity 20 cannot be accessed through a wall of the cavity 20. The aerosolisable material can therefore only be accessed by an entrance through which the aerosolisable material is inserted into the cavity 20. In other embodiments, the entrance may be through a side wall rather than an end of the cavity 20. In such an example, the article comprising aerosolisable material may be inserted in a direction radial to the longitudinal axis A-A.

As shown in FIG. 1, a portion of the body 10 is open. The open portion provides access to the cavity 20 from outside of the heating assembly 1. In some examples, the body 10 is openable for insertion of the aerosolisable material into the cavity 20. For example, the cavity 20 of the body 10 may be closed by a removable or openable cap or lid. An open end 40 of the body 10 is shown in FIG. 1 that is communicable with the cavity 20. The open end 40 is an aperture through which aerosolisable material is insertable. The open end 40 is provided at a downstream end of the heating assembly 1 through which the aerosolisable material is first inserted in an upstream direction towards an upstream end opposite the downstream end. In use, at least one component of volatised aerosolised material is configured to flow away from the heating assembly 1 in a direction from the upstream end to the downstream end. Therefore, the aerosolisable material enters the cavity 20 via the open end 40. The open end 40 is defined by the second portion 12 in this embodiment.

The heating assembly 1 comprises a heating element 30. The heating element 30 may be a susceptor that is capable of being inductively heated. The heating element 30 is configured to be in thermal proximity to aerosolisable material when the aerosolisable material is inserted into the cavity 20 of the heating assembly 1. In contrast, the body 10 may be formed of a material that is not capable of being inductively heated. The body may therefore act as an electrical insulator. In other embodiments, the heating element 30 may not be limited to being inductively heated. The heating element 30 may therefore be heatable by electrical resistance. The heating assembly 1 may therefore comprise electrical contacts for electrical connection with the apparatus for electrically activating the heating element 30 by passing a flow of electrical energy through the heating element 30.

The heating assembly 1 comprising the heating element 30 may be provided as a product that is discarded once used. That is, the heating element 30 may be fixed to the body 10 and not readily removable from the body 10 by a user. Alternatively, the heating element 30 may be removable from the body 10 of the heating assembly 1 and discarded when used. Therefore, the heating element 30 could be replaced with another heating element 30 when an article comprising aerosolisable material of a different type, such as a different flavour, is for insertion into the cavity 20 of the heating assembly 1. This helps to avoid cross contamination of different flavours. When provided as a removeable item, the heating element 30 may be combinable with the heating assembly 1 to form a consumable item. The heating element 30 may therefore be mounted to the body 10 of the heating assembly 1. Due to an intimate contact between the heating element 30 and a consumable item (such as an article comprising aerosolisable material), depositions of aerosol or heated components of the consumable item may collect on the heating element 30. Therefore, to improve hygiene, the heating element 30 may be disposed of and replaced with another heating element 30. A need for replacement may be determined by detecting information about a use of the apparatus as discussed in relation to FIG. 4. For example, a user may be alerted that the heating element 30 should be replaced after a predetermined number of sessions, for example at least 20 sessions. In some embodiments, the alert comprises a visual and/or audible indicator. Each session may be the time between activation and deactivation of the heating element 30 during which the user draws on an article to inhale the volatised components produced by the aerosolisable material. The number of sessions to replace the heating element 30 may be after 20 to 40 sessions, for example.

The heating element 30 is elongate in this embodiment. A length of the heating element 30 is therefore greater than a width of the heating element 30 perpendicular to a longitudinal axis A-A of the heating assembly 1. The heating element 30 extends from a base 14 of the body 10 into the cavity 20 of the heating assembly 1. The heating member comprises a main body 31 and a tapered portion 32. The tapered portion 32 is located at a tip of the main body 31. The tapered portion 32 is for penetration into the aerosolisable material. In some embodiments, the tapered portion 32 is tapered. The tapering may be towards a pointed end. Therefore, the heating element 30 shown in this embodiment is a male member such as a rod, blade or pin and configurable to penetrate an article comprising aerosolisable material when the article is received in the cavity 20 of the heating assembly 1. In this embodiment, the male member is configured to extend along the central axis A-A of the heating zone 110. However, in other embodiments, the male member may be offset from the central axis A-A. In either case, the male member is configured to automatically penetrate an article 70 comprising aerosolisable material when the article 70 is pressed onto the male member. When inserted into the cavity 20 of the heating assembly 1, the consumable is brought into contact and closely mates with the heating element 30.

Figure 5:
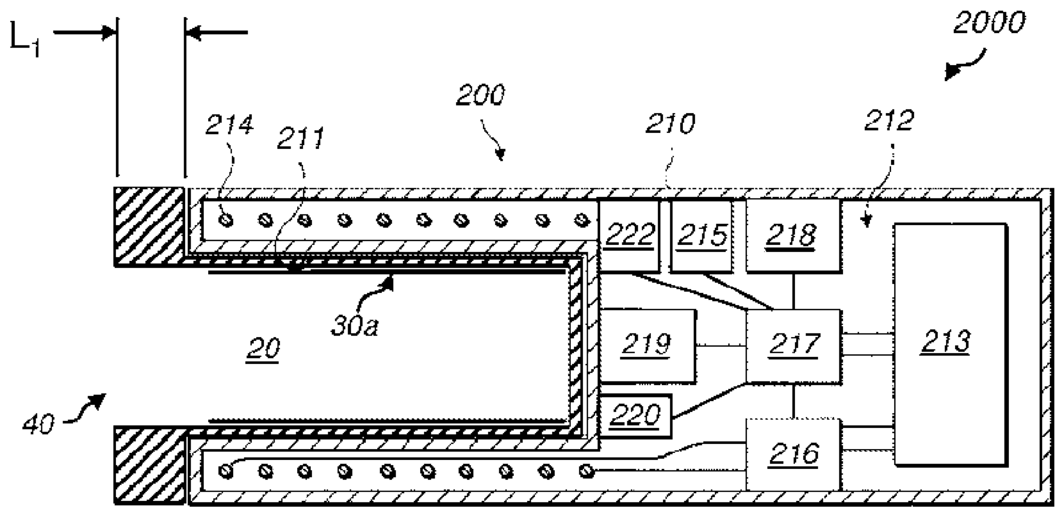
FIG. 5 shows a schematic cross-sectional side view of another example system for is heating aerosolisable material to volatilise at least one component of the aerosolisable material.

In some embodiments, the heating element 30 may be tubular. The tubular heating element 30 may be insertable within the cavity 20 of the body 10. The tubular heating element 30 may have a longitudinal axis that is parallel to the longitudinal axis A-A of the heating apparatus 1. The longitudinal axis of the heating element 30 may be coaxial with the longitudinal axis A-A of the heating apparatus 1. The tubular heating element 30 may at least partially define a wall of the cavity 20 into which an article comprising aerosolisable material is inserted. An example of this is shown in FIG. 5 and discussed below.

Referring to FIG. 2, an article 2 comprising aerosolisable material **2*a* in the form of a rod is shown. The article 2 may comprises a cover around the aerosolisable material 2*a*. The cover encircles the aerosolisable material 2*a* and helps to protect the aerosolisable material 2*a* from damage during transport and use of the article 2. The cover may comprise an adhesive (not shown) that adheres overlapped free ends of the wrapper to each other. The adhesive helps prevent the overlapped free ends of the wrapper from separating. In other embodiments, the adhesive and/or the cover may be omitted. In still other embodiments, the article may take a is different form to any of those discussed above. The article 2 may comprise at least one filter (not shown). The article 2 comprises a downstream end and an upstream end, wherein the upstream end is insertable into the cavity 20 of the heating assembly 1 before the downstream end. The article 2 is configured such that a user draws a volatised component(s) of the aerosolisable material through the downstream end of the article 2**.

The article 2 is insertable into the cavity 20 of the heating assembly 1 in a direction of the longitudinal axis A-A. In this embodiment, the insertion direction of the article 2 is the same as the insertion direction of the heating assembly 1 into an apparatus for heating the heating element 30 of the heating assembly 1. The article 2 is therefore inserted into the heating assembly 1 in an upstream direction. Equally, the heating assembly 1 is inserted into the apparatus in an upstream direction. The article 2 comprises a mouth end and a distal end. The distal end is an upstream end and the mouth end is a downstream end. The distal end of the article **2*a* is first inserted into the cavity 20 via the open end 40. The heating assembly 1 therefore comprises a downstream end (for example, a distal end) and an upstream end (for example, a proximal end). When fully inserted into the cavity 20, the article 2** abuts the downstream end but protrudes away from the proximal end.

An insertion force F1 is required to overcome the resistance of the heating assembly 1 to move the article 2. The insertion force F1 may be substantially constant or may varying with degree of insertion of the article 2. As the article 2 is continued to be inserted into the cavity 20, an end of the article 2 is pierced by the tapered portion 32 of the heating element 30. When fully inserted into the heating assembly 1, the article 2 is configured to protrude from the heating assembly 1. The heating assembly 1 has a length Lo that is smaller than a length of the article 2, which causes the protrusion. Given that the heating assembly 1 is removable from the apparatus, the article 2 may be inserted before or after coupling of the heating assembly 1 with the apparatus. Equally, the article 2 may be removed from the heating assembly 1 before or after decoupling of the heating assembly 1 with the apparatus. The coupler of the heating assembly 1 may resist movement of the heating assembly 1 from the retainer of the apparatus when the article 2 is withdrawn from the heating assembly 1. A connection force of the coupler and retainer may therefore be larger than a force to remove the article 2 from the heating assembly 1.

Figure 3:
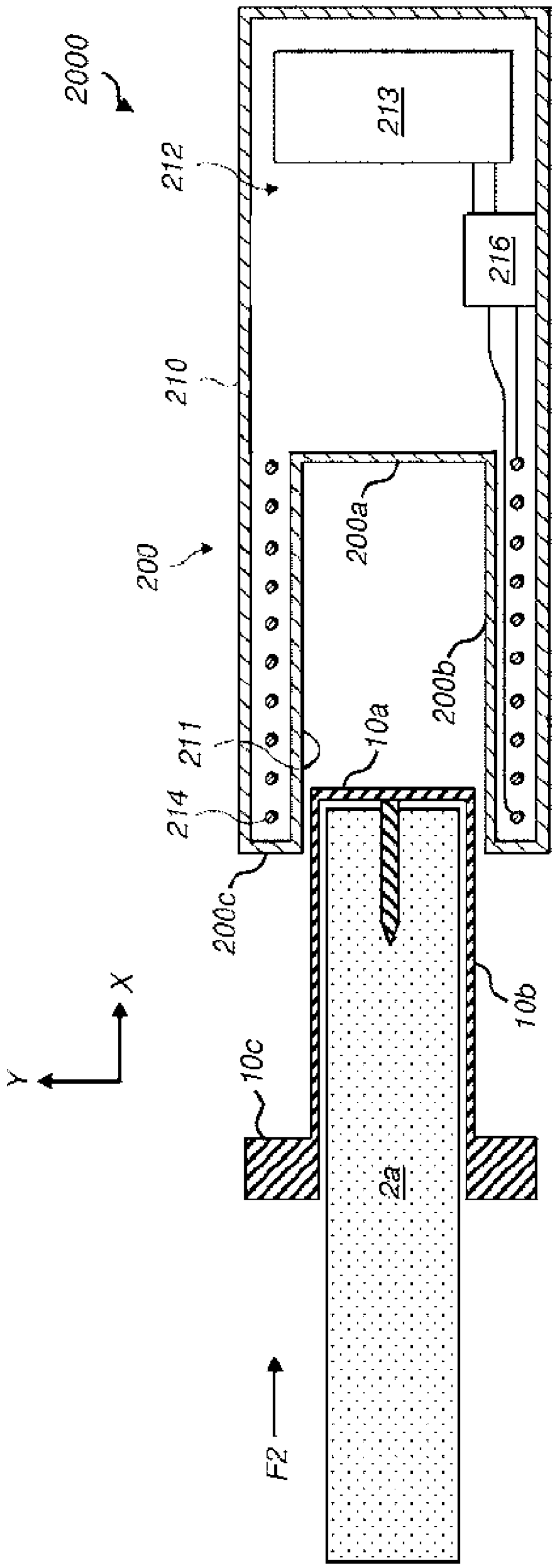
FIG. 3 shows a schematic cross-sectional side view of an example of a system for heating aerosolisable material to volatilise at least one component of the aerosolisable material and an example of an article comprising aerosolisable material insertable into the heating assembly of the system.

Referring to FIG. 3, there is shown a schematic cross-sectional side view of an example of a system 2000 according to an embodiment of the invention. The system 2000 comprises an apparatus 200 and a heating assembly 1 as shown in FIGS. 1 and 2 insertable into the apparatus. The article 2 comprising the aerosolisable material **2*a*, as discussed in FIG. 2, is further shown. The heating assembly 1 comprises the heating element 30 for use in heating aerosolisable material to volatilise at least one component of the aerosolisable material, as discussed in relation to FIGS. 1 and 2. The apparatus 200 comprises a magnetic field generator 212 for generating a varying magnetic field in use. The heating element 1 is formed from heating material that is heatable by penetration with the varying magnetic field. The magnetic field generator 212 comprises an electrical power source 213 and a device 216 for passing a varying electrical current, such as an alternating current, through a coil 214**.

The apparatus 200 comprises a housing 210 defining a heating zone 211. The heating zone 211 is a chamber into which the heating assembly 1 is insertable. The chamber of the apparatus 200 is therefore a receiving portion. The chamber may comprise a surface that is shaped complementarily to a mating surface of the heating assembly 1.

As shown in FIG. 3, the article 2 is first inserted into the heating assembly 1 before the heating assembly 1 and article 2 are inserted as one into the heating zone 211 of the apparatus 200. However, the heating assembly 1 may be first inserted into the heating zone 211 of the apparatus 200 before the article 2 is inserted into the cavity 20 of the heating assembly 1. The combined heating assembly 1 and article 2 are inserted in a direction X which corresponds to a longitudinal dimension of the apparatus. Once inserted, the heating assembly 1 may be restrained by the apparatus 200 so that the heating assembly 1 is immoveable relative to the apparatus 200 in a direction Y, which is a direction perpendicular to the direction X.

The heating assembly 1 is shown with coupling regions, for example a first surface **10*a*, second surface 10*b* and a third surface 10*c*. Each coupling region may be referred to as a coupler. Although a single coupler 10*a*, 10*b*, 10*c* may be needed to engage with a respective retainer 200*a*, 200*b*, 200*c* of the apparatus, a plurality of couplers may be provided. The coupler 10*a*, 10*b*, 10*c* may be suitable for restraining movement, e.g. longitudinal movement, of the heating assembly 1 relative to the apparatus 200 when the heating assembly 1 is installed in the apparatus 200. The coupler 10*a*, 10*b*, 10*c* and/or retainer 200*a*, 200*b*, 200*c* therefore act as a blocking member to block a movement of the heating assembly 1 and retain the heating assembly 1 in the apparatus 200 relative to at least one direction of movement, e.g. movement in is the direction X and/or direction Y. Such directional movement may be axial movement which is movement in an axial direction of the heating assembly 1, for example along the longitudinal axis A-A, shown in FIG. 1 (corresponding to direction X). The coupler 10*a*, 10*b*, 10*c* and/or retainer 200*a*, 200*b*, 200*c* may resist translational movement of the heating assembly 1 (corresponding to direction Y). Alternatively, or additionally, each coupler 10*a*, 10*b*, 10*c* and/or each respective retainer 200*a*, 200*b*, 200*c* may resist rotation of the heating assembly 1 relative to the apparatus 200** about the longitudinal axis A-A.

The coupler **10*a*, 10*b*, 10*c* and/or retainer 200*a*, 200*b*, 200*c* may be an abutment member for abutting at least one surface of the respective apparatus 200 or heating assembly 1. The coupler 10*a*, 10*b*, 10*c* and/or retainer 200*a*, 200*b*, 200*c* may limit the extent of movement of the heating assembly 1**.

The coupler **10*a*, 10*b*, 10*c* may be blockable by a corresponding abutment member or portion of the apparatus 200 to prevent movement of the heating assembly 30 in the apparatus 200, particularly when an article containing aerosolisable material is removed from the heating assembly 1. Interaction between the coupler 10*a*, 10*b*, 10*c* and respective retainer 200*a*, 200*b*, 200*c* may be used to hold the heating assembly 1 in a specific location in the apparatus 200 as opposed to relying on restraining movement by a push fit relationship between the body 10 of the heating assembly 1 and the apparatus 200. Therefore, an engagement force F2 may be required to couple the heating assembly 1 with the apparatus 200. The engagement force F2 may be greater than the insertion force F1 discussed in relation to FIG. 2**.

A push fit relationship, in this instance, is when a first member is insertable into a second member using an insertion force. The insertion force is force exertable by a user's fingers to overcome frictional resistance between the first and second members. Said frictional resistance holds the first and second members together under friction as one combination. Therefore, separation of the first and second members is achieved by exerting a finger force similar to the insertion force. In a push fit relationship, the first and second members are not free to move relative to each other but are also not permanently fixed in position relative to each other.

The coupler 10*a*, 10*b*, 10*c* and respective retainer 200*a*, 200*b*, 200*c* may prevent free movement of the heating assembly 1 without being fixed in position. The coupler 10*a*, 10*b*, 10*c* and respective retainer 200*a*, 200*b*, 200*c* therefore facilitate improved retention of the heating assembly 1 in an apparatus 200, such as the examples described in FIG. 4. Close positioning is of the heating assembly 1 with an article comprising aerosolisable material provides improved heat transfer to the article.

Figure 4:
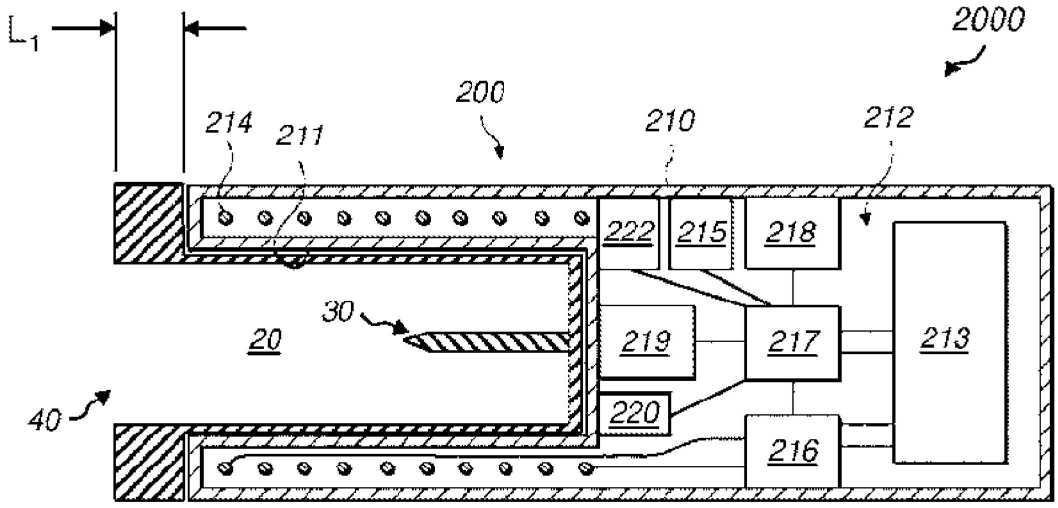
FIG. 4 shows a schematic cross-sectional side view of the example system of FIG. 3.

Referring to FIG. 4 there is shown a cross-sectional side view of an example of a system 2000 according to an embodiment of the invention. Features in FIG. 4 with the same reference numeral as FIGS. 1 to 3 are the same.

The system 2000 comprises apparatus 200 and a heating assembly 1 insertable into the apparatus, wherein the heating assembly 1 comprises a heating element 30 for use in heating aerosolisable material to volatilise at least one component of the aerosolisable material. The apparatus 200 comprises a magnetic field generator 212 for generating a varying magnetic field in use. The heating element 1 is formed from heating material that is heatable by penetration with the varying magnetic field.

More specifically, the apparatus 200 of this embodiment comprises a housing 210. A mouthpiece (not shown) may be connected to the housing 210 and/or the heating assembly 1. The mouthpiece may be made of any suitable material, such as a plastics material, cardboard, cellulose acetate, paper, metal, glass, ceramic, or rubber. The mouthpiece may define a channel therethrough. The mouthpiece may be locatable relative to the housing 210 so as to cover an opening into a heating zone 211 or a cavity 20 of the heating assembly 1 when the heating assembly 1 is inserted into the heating zone 211. When the mouthpiece is so located relative to the housing 210, the channel of the mouthpiece is in fluid communication with the heating zone 211. In use, the channel acts as a passageway for permitting volatilised material to pass from aerosolisable material of an article inserted in the heating zone 211 to an exterior of the apparatus 200. the mouthpiece of the apparatus 200 may be releasably engageable with the housing 210 so as to connect the mouthpiece to the housing 210. In other embodiments, the mouthpiece and the housing 210 may be permanently connected, such as through a hinge or flexible member. In some embodiments, such as embodiments in which the article itself comprises a mouthpiece, the mouthpiece of the apparatus 200 may be omitted.

The apparatus 200 may define an air inlet (not shown) that fluidly connects the heating zone 211 with the exterior of the apparatus 200. Such an air inlet may be defined by the housing 210 and/or by an optional mouthpiece. A user may be able to inhale the volatilised component(s) of the aerosolisable material by drawing the volatilised component(s) through the channel of the optional mouthpiece. As the volatilised component(s) are removed from an article, air may be drawn into the heating zone 211 via the air inlet of the apparatus 200.

In the embodiment of FIG. 4, no mouthpiece is present. An article comprising aerosolisable material (also not shown) may be provided with a mouth end through which a user draws volatilised component(s) of the aerosolisable material. The mouth end may act as a mouthpiece. The cavity 20 of the heating assembly is therefore open until the article is inserted into the cavity 20 to close an open end 40 of the heating assembly 1.

In this embodiment, the housing 210 of the apparatus 200 receives the heating assembly 1 comprising the heating element 30. An inner dimension of the heating zone 211 of the apparatus 200, for example an inner diameter, is therefore greater than the first width $W_1$ of the body 2 of the heating assembly 1. In this embodiment, a wall of the cavity 20, which is an internal surface of the cavity 20, restricts the heating zone 211 and engages with a portion of an article comprising aerosolisable material. The portion of the article is an upstream portion. The walls of the cavity 20 mechanically mate with the article in order to co-operate with and receive the article. In this embodiment, the heating zone 211 is elongate, and is sized and shaped to accommodate the whole of a first portion 11 of a body 10 of the heating assembly 1. In other embodiments, the heating zone 211 may be dimensioned to receive only a portion of the first portion 11 of the body 10.

The heating assembly 1 comprising the heating element 30 is receivable within an accommodating part of the body 210 of the apparatus 200. The heating element 30 is shown to partially extend within a portion of an accommodating part of the body 210, such as an upstream portion of the accommodating part. The heating assembly 1 comprises an abutment which determines an extent of entry of the heating assembly 1 within the heating zone 211. A wall of the second portion 12 of the body 10 of the heating assembly may act as the abutment to abut a respective wall of the housing 210 of the apparatus 200. The wall is an exterior wall. The wall may be an upstream wall of the second portion 12 of the body 10 and/or may be an upstream wall of the first portion 11 of the body 10. Alternatively, full activation of an engagement mechanism, such as a screw thread, may determine an extent of entry of the heating assembly 1 within the heating zone 211. The abutment blocks movement of the heating assembly 1 by contact between the apparatus 200 and heating assembly 1. When the heating assembly 1 is installed in the apparatus 200, the abutment may restrain movement of the heating assembly 1 relative to the apparatus 200 by contact with the abutment. The heating assembly 1 is removable from the apparatus 200 to access the heating zone 211 and clean or inspect the heating zone 211, for example.

In this embodiment, the magnetic field generator 212 comprises an electrical power source 213, a coil 214, a device 216 for passing a varying electrical current, such as an alternating current, through the coil 214, a controller 217, and a user interface 218 for user-operation of the controller 217. The apparatus 200 of this embodiment further comprises a temperature sensor 219 for sensing a temperature of the heating zone 211.

In this embodiment, the apparatus 200 further comprises a sensor 215 to detect information about a use of the apparatus 200 when the apparatus 200 is coupled to the heating assembly 1. The information may be stored in a memory 222 of the apparatus. The memory 222 is a data storage device. The sensor 215 is to further perform an action when the information meets a predetermined criterion. In some embodiments, the sensor provides an indication when the information meets a predetermined criterion. The predetermined criterion may be a total power on time. For example, the information detected by the sensor 215 may be an elapsed time. A total power on time therefore corresponds to a detected time elapsed from the apparatus 200 being turned on. The apparatus 200 may be considered turned on when the heating element 30 is first activated. Alternatively, or additionally, the sensor 215 may detect information about a number of sessions of use of the apparatus. A single session may comprise a predetermined number of draws on an article by a user. Alternatively, a single session may comprise a predetermined time from when the user first draws on an article or when the heating element 30 is first activated.

The controller 217 is configured to control the heating device 216 based on the information. In some embodiments, the information may be analysed by an analyser 220 of the apparatus 200. The analyser 220 receives information from at least one sensor 215, 219 and the information is sent to the controller to determine how to control the heating device 216 based on the information analysed by the analyser 220. For example, the heating device 216 may be configured to measure a number of sessions, which may be a number of activations of the power on button or a puff sensor, or may be configured to measure a total power used or power on time. Once a threshold is reached, the heating device 216 may indicate to a user that the heating element 30 needs changing and/or the heating device 216 may not allow the heating element 30 to be heatable.

The electrical power source 213 of this embodiment is a rechargeable battery. In other embodiments, the electrical power source 213 may be other than a rechargeable battery, such as a non-rechargeable battery, a capacitor, a battery-capacitor hybrid, or a connection to a mains electricity supply.

The coil 214 may take any suitable form. In this embodiment, the coil 214 is a helical coil of electrically-conductive material, such as copper. In some embodiments, the magnetic field generator 212 may comprise a magnetically permeable core around which the coil 214 is wound. Such a magnetically permeable core concentrates the magnetic flux produced by the coil 214 in use and makes a more powerful magnetic field. The magnetically permeable core may be made of iron, for example. In some embodiments, the magnetically permeable core may extend only partially along the length of the coil 214, so as to concentrate the magnetic flux only in certain regions. In some embodiments, the coil 214 may be a flat coil. That is, the coil 214 may be a two-dimensional spiral. In this embodiment, the coil 214 encircles the heating zone 211. The coil 214 extends along a longitudinal axis that is substantially aligned with a longitudinal axis of the heating zone 211. The aligned axes are coincident. In a variation to this embodiment, the aligned axes may be parallel or oblique to each other. In other embodiments, the coil 214 may be other than helical. For example, the coil 214 may be spiral. In some embodiments, the magnetic field generator 212 comprises a plurality of coils 214 for generating respective magnetic fields for penetrating respective portions of the heating element 30.

When the heating assembly 1 is coupled with the apparatus 200, a length Li of the heating assembly 1 protrudes from the cavity 20. The protrusion may be comprised by at least a portion of the second portion 12 of the body 10 of the heating assembly 1, as shown in FIG. 4. The protrusion provides a portion that can be gripped by a user to decouple the heating assembly 1 from the apparatus 2 and remove the heating assembly 1. That is, a portion of the heating assembly 1 protrudes from within the heating zone 211 so as to be grippable by a user to withdraw the heating assembly 1 from the heating zone 211. The portion may configured to be gripped by a user's fingers and may not require tools to remove the heating assembly 1. The portion may be rotated or moved linearly relative to the apparatus 200 to withdraw the heating assembly 1 from the apparatus 200.

Referring to FIG. 5 there is shown a schematic perspective view of an example of a system 2000 according to an embodiment of the invention. The system 2000 comprises apparatus 200 and a heating assembly 1 insertable into the apparatus wherein the heating assembly 1 comprises a heating element 30*a* for use in heating aerosolisable material to volatilise at least one component of the aerosolisable material. Features in FIG. 5 with the same reference numeral as FIG. 4 are the same. The difference between FIGS. 4 and 5 is that the heating element 30 in FIG. 4 is elongate and in the form of a blade, whereas, in FIG. 5, the heating element 30*a* is tubular.

The heating element 30*a* shown in FIG. 5 is hollow. The heating element 30*a* may be formed from a sheet. The heating element 30*a* may be a single piece. The sheet may have a constant thickness. The heating element 30*a* may have a constant cross-sectional shape. For example, the heating element 30*a* may be substantially circular, square or rectangular in cross-section along a length of the heating element 30*a*. A length of the heating element 30*a* may be greater than a width of the heating element 30*a* perpendicular to the length. In other embodiments, the length and width may be substantially equal. In yet more embodiments, the heating element 30*a* may have a length smaller than a width.

The heating element 30*a* shown in FIG. 5 is generally cylindrical with a substantially circular cross section. In other embodiments, the heating element 30*a* may have an oval or elliptical cross section or may be other than cylindrical. In some embodiments, the heating element 30*a* may have a polygonal, quadrilateral, rectangular, square, triangular, star-shaped, or irregular cross section, for example. In this embodiment, the heating element 30*a* is a tube. The heating element 30*a* comprises a chamber which is a hollow inner region of the tube. The chamber may correspond to a heating zone when the heating element 30*a* is arranged in an apparatus 200. The chamber is configured for receiving the aerosolisable material.

The heating element 30*a* may comprise an extruded member formed by an extrusion process. The extruded member may be tubular so that a cross section of the body is endless with no joins.

The heating element 30*a* in FIG. 5 is open at both a first end and a second end that is opposite the first end. The first end therefore comprises a first opening and the second end comprises a second opening. The first and second openings may be axially aligned on the longitudinal axis A-A shown in FIG. 1. The first and second openings may be parallel to one another. Aerosolisable material may be insertable into the cavity 20 through an opening 40. Therefore, the opening 40 is the initial point of passage of aerosolisable material into the cavity 20. Longitudinal wall(s) of the heating element 30*a* extend between the first end and the second end of the heating element 30*a*. Alternatively, the heating element 30*a* may have a single open end.

A thickness of the heating element 30*a* may be less than 100 μm. The thickness may be between 10 μm and 40 μm. The thickness may be between 20 μm and 30 μm. The thickness may be about 25 μm.

In some embodiments, the heating material is aluminium. However, in other embodiments, the heating material may be other than aluminium. In some embodiments, the heating material may comprise one or more materials selected from the group consisting of: an electrically-conductive material, a magnetic material, and a magnetic electrically-conductive material. In some embodiments, the heating material may comprise a metal or a metal alloy. In some embodiments, the heating material may comprise one or more materials selected from the group consisting of: aluminium, gold, iron, nickel, cobalt, conductive carbon, graphite, steel, plain-carbon steel, mild steel, stainless steel, ferritic stainless steel, molybdenum, silicon carbide, copper, and bronze. Other heating material(s) may be used in other embodiments.

In some embodiments, the sheet comprising heating material is a free from holes or discontinuities. In some embodiments, the sheet comprising heating material comprises a foil, such as a metal or metal alloy foil, e.g. aluminium foil. However, in some embodiments, the sheet comprising heating material may have holes or discontinuities. For example, in some embodiments, the sheet comprising heating material may comprise a mesh, a perforated sheet, or a perforated foil, such as a metal or metal alloy perforated foil, e.g. perforated aluminium foil.

In some embodiments, such as those in which the heating material comprises iron, such as steel (e.g. mild steel or stainless steel) or aluminium, the sheet comprising heating material may be coated to help avoid corrosion or oxidation of the heating material in use. Such coating may, for example, comprise nickel plating, gold plating, or a coating of a ceramic or an inert polymer. In some embodiments, the sheet comprising heating material comprises or consists of nickel plated aluminium foil.

The heating material may have a skin depth, which is an exterior zone within which most of an induced electrical current and/or induced reorientation of magnetic dipoles occurs. By providing that the heating material has a relatively small thickness, a greater proportion of the heating material may be heatable by a given varying magnetic field, as compared to heating material having a depth or thickness that is relatively large as compared to the other dimensions of the heating material. Thus, a more efficient use of material is achieved and, in turn, costs are reduced.

In some embodiments, the aerosolisable material comprises tobacco. However, in other embodiments, the aerosolisable material may consist of tobacco, may consist substantially entirely of tobacco, may comprise tobacco and aerosolisable material other than tobacco, may comprise aerosolisable material other than tobacco, or may be free from tobacco. In some embodiments, the aerosolisable material may comprise a vapour or aerosol forming agent or a humectant, such as glycerol, propylene glycol, triacetin, or diethylene glycol.

In some embodiments, the aerosolisable material is non-liquid aerosolisable material, and the apparatus is for heating non-liquid aerosolisable material to volatilise at least one component of the aerosolisable material.

In some embodiments, the article 2 is a consumable article. Once all, or substantially all, of the volatilisable component(s) of the aerosolisable material 2*a* in the article 2 has/have been spent, the user may remove the article 2 from the cavity 20 of the heating assembly 1 and dispose of the article 2. The user may subsequently re-use the apparatus 200 with another of the articles 2. However, in other respective embodiments, the article 2 may be non-consumable relative to the heating assembly. That is, the heating assembly 1 and the article 2 may be disposed of together once the volatilisable component(s) of the aerosolisable material 2*a* has/have been spent.

In some embodiments, the article 2 is sold, supplied or otherwise provided separately from the apparatus 200 with which the article 2 is usable. However, in some embodiments, the apparatus 200 and one or more of the articles 2 may be provided together as a system, such as a kit or an assembly, possibly with additional components, such as cleaning utensils.

In order to address various issues and advance the art, the entirety of this disclosure shows by way of illustration and example various embodiments in which the claimed invention may be practised and which provide for superior heating elements for use with apparatus for heating aerosolisable material, methods of forming a heating element for use with apparatus for heating aerosolisable material to volatilise at least one component of the aerosolisable material, and systems comprising apparatus for heating aerosolisable material to volatilise at least one component of the aerosolisable material and a heating element heatable by such apparatus. The advantages and features of the disclosure are of a representative sample of embodiments only, and are not exhaustive and/or exclusive. They are presented only to assist in understanding and teach the claimed and otherwise disclosed features. It is to be understood that advantages, embodiments, examples, functions, features, structures and/or other aspects of the disclosure are not to be considered limitations on the disclosure as defined by the claims or limitations on equivalents to the claims, and that other embodiments may be utilised and modifications may be made without departing from the scope and/or spirit of the disclosure. Various embodiments may suitably comprise, consist of, or consist in essence of, various combinations of the disclosed elements, components, features, parts, steps, means, etc. The disclosure may include other inventions not presently claimed, but which may be claimed in future.

The invention claimed is:

1. A heating assembly for use with apparatus for heating aerosolizable material to volatilize at least one component of the aerosolizable material, the heating assembly comprising:
- a body having a cavity for storing the aerosolizable material and for insertion into a heating zone of the apparatus, the body comprising a first portion and a second portion, wherein the second portion of the body is open or openable for insertion of the aerosolizable material into the cavity;
- a heating element extendable in the cavity for use in heating the aerosolizable material when the aerosolizable material is in the cavity; and
- a coupler for coupling the heating assembly to a retainer of the apparatus,
- wherein the body comprises a solid base which defines a solid internal end surface of the first portion of the body.

2. The heating assembly of claim 1, wherein the body comprises an open end communicable with the cavity.

3. The heating assembly of claim 1, wherein the coupler is for coupling to the retainer by an interference fit with the retainer.

4. The heating assembly of claim 1, wherein the coupler comprises a first thread for engagement with a respective second thread of the retainer of the apparatus.

5. The heating assembly of claim 1, wherein the heating element extends into the cavity.

6. The heating assembly of claim 1, wherein the heating element comprises heating material that is heatable by penetration with a varying magnetic field.

7. A heating assembly for use with apparatus for heating aerosolizable material to volatilize at least one component of the aerosolizable material, the heating assembly comprising:
- a body having a cavity for storing the aerosolizable material and for insertion into a heating zone of the apparatus, the body comprising a first portion and a second portion, wherein the second portion of the body is open or openable for insertion of the aerosolizable material into the cavity; and a heating element extendable in the cavity for use in heating the aerosolizable material when the aerosolizable material is in the cavity;

wherein the first portion has a first width insertable into the heating zone of the apparatus and the second portion has a second width greater than the first width that is non-insertable into the heating zone, and wherein the body comprises a solid base which defines a solid internal end surface of the first portion of the body.

8. The heating assembly of claim 7, wherein the second portion comprises an aperture communicable with the cavity such that aerosolizable material is insertable through the aperture and into the cavity.

9. The heating assembly of claim 7, wherein the heating element extends from a base of the first portion into the cavity and towards the second portion.

10. The heating assembly of claim 9, wherein the heating member comprises an axis parallel to a longitudinal axis of the first portion.

11. An apparatus for heating aerosolizable material to volatilise at least one component of the aerosolizable material, the apparatus comprising:

a heating zone for receiving a body of a heating assembly;

a heating device for causing heating of a heating element of the heating assembly when the heating assembly is present in the heating zone; and a sensor to detect information about a use of the apparatus when the heating assembly is present in the heating zone, and to perform an action when the information meets a predetermined criterion, wherein the information comprises information about a number of sessions of use of the apparatus and/or information about a total power on time of the apparatus.

12. The apparatus of claim 11, wherein the heating device comprises a magnetic field generator for generating a varying magnetic field that penetrates the heating zone in use.

13. The apparatus of claim 11, wherein the apparatus comprises a controller to control the heating device on the basis of the information.

14. The apparatus of claim 13, wherein the controller is to alter heating of the heating element when the predetermined criterion is met.

15. The apparatus of claim 11, wherein the apparatus comprises a retainer for retaining the heating assembly in the heating zone, wherein the retainer is for retaining the heating assembly by an interference fit between the retainer and a coupler of the heating assembly.

16. A system for heating aerosolizable material to volatilise at least one component of the aerosolizable material, the system comprising:

the heating assembly of claim 1; and an apparatus comprising a heating zone for receiving the heating assembly, and comprising a heating device for causing heating of the heating element of the heating assembly when the heating assembly is present in the heating zone;

wherein, when the heating assembly is fully inserted in the heating zone of the apparatus, a portion of the heating assembly protrudes from within the heating zone so as to be grippable by a user to withdraw the heating assembly from the heating zone.

17. The system of claim 16, wherein:

the apparatus comprises a retainer; and wherein the retainer is for retaining the coupler by an interference fit between the coupler and retainer.

18. The system of claim 16, wherein the system is for heating non-liquid aerosolizable material.

19. The system according of claim 16, wherein the cavity is to receive aerosolizable material in the form of a rod.

* * * * *